United States Patent [19]

Roy et al.

[11] Patent Number: 4,847,733
[45] Date of Patent: Jul. 11, 1989

[54] RESILIENT ELECTRICAL COMPONENT HOUSING BRACKET

[75] Inventors: Dhirendra C. Roy, Canton; John N. Topolewski, Westland, both of Mich.

[73] Assignee: United Technologies Automotive, Inc., Dearborn, Mich.

[21] Appl. No.: 164,616

[22] Filed: Mar. 7, 1988

[51] Int. Cl.⁴ ............................................. H02B 1/02
[52] U.S. Cl. .................................. 361/427; 248/223.1; 248/300; 312/245
[58] Field of Search ............... 361/331, 391, 420, 427, 361/429, 430, 393, 394, 417, 419, 420; 248/222.4, 223.1, 224.4, 225.1, 300, 629, 221.3, 221.4, 222.1; 174/63; 312/245

[56] References Cited

U.S. PATENT DOCUMENTS

| | | | |
|---|---|---|---|
| 2,988,017 | 6/1961 | Stough | 248/222.4 X |
| 3,156,282 | 11/1964 | Bedford, Jr. | 248/223.1 X |
| 3,278,149 | 10/1966 | Brucker | 248/221.4 X |
| 3,491,820 | 1/1970 | Ostling | 248/221.3 X |
| 3,918,234 | 11/1975 | Weissman | 52/760 |
| 4,310,193 | 1/1982 | Kolleas | 296/75 |
| 4,534,472 | 8/1985 | Hänseler et al. | 211/41 |
| 4,591,949 | 5/1986 | Lahr | 361/394 |
| 4,620,265 | 10/1986 | Lerude et al. | 361/424 |

Primary Examiner—A. D. Pellinen
Assistant Examiner—David Osborn

[57] ABSTRACT

A unitary resilient bracket (1) for mounting a plurality of electrical component housings (70, 76) to a mounting surface (80) in a space saving vertical arrangement using a minimum of individual fasteners while allowing access to the components located within the housings.

Bracket (1) includes keyways (21, 23, 25, 27, 29) for accommodating a multiplicity of keys (74, 78) located on housings (70, 76 respectively) in combination with housing retaining members (60) and flange lock (4) interacting with flange (72) to secure the housings to the bracket.

Bracket (1) is secured to mounting surface (80) by fasteners passing through fastening flanges (2) and a primary lock tab (62) which is disposed in a receiving slot (82) located in mounting surface (80).

8 Claims, 5 Drawing Sheets

RESILIENT ELECTRICAL COMPONENT HOUSING BRACKET

CROSS REFERENCE TO RELATED APPLICATIONS

This application relates to commonly assigned copending U.S. patent application Ser. No. 100,160 for VENTILATED SPLASH RESISTANT ELECTRICAL COMPONENT HOUSING.

TECHNICAL FIELD

The field of art to which this invention pertains is resilient brackets for accommodating electrical component housings particularly suitable for use with electrical power distribution networks in motor vehicles and specifically fuse device and relay housings.

BACKGROUND ART

Electrical component housings are commonly used in the automotive industry to house fuse devices and relay devices that are necessary to protect or perform various functions in a motor vehicle's electrical power distribution network.

The component housings must be accessible by diagnosticians for carrying out inspections and possibly replacing failed devices contained within the housings. Therefore, easy access to the interior of the housings is desirable.

The component housings are typically mounted on a suitable surface or surfaces in either the passenger compartment or in the engine compartment. The housings are mounted directly to the surface by bolts, screws or similar fasteners. In the alternative, a housing is mounted onto a bracket by bolts, screws or similar fasteners and the bracket, in turn, is fastened to the chosen surface or surfaces.

There are advantages to using a bracket. A resilient bracket is useful in isolating electrical devices contained within the housing from road shocks and vibrations that a vehicle encounters while in service. Additionally by using a bracket, the housing may be attached to an irregular surface that would not be suitable for direct mounting of the housing.

However, with a bracket additional time and fasteners are used as part of the process of installing the housing during the assembly of the motor vehicle. Therefore, there is a need for a bracket in which housings may be easily and quickly attached with a minimum of fasteners, yet allowing access to the interior of the housing and easy removal of the housings from the bracket if needed.

DISCLOSURE OF THE INVENTION

An object of this disclosure is to provide a resilient electrical component housing mounting bracket that can accommodate more than one such housing without using fasteners such as bolts or screws to secure the housings to the bracket.

Another object of this disclosure is to provide a resilient bracket that allows the housings to be installed onto the bracket prior to installing the bracket on a chosen surface or surfaces of a motor vehicle.

A further object of this disclosure is to provide a resilient bracket that allows the housings to be removed from the bracket without removing the previously installed bracket from the chosen surface or surfaces.

Another object of this disclosure is to provide a resilient bracket that allows for the vertical arrangement of the housings for saving space in a location of limited space, such as a crowded engine compartment. Yet, the vertical arrangement allows easy access to the interior of the housings for maintaining electrical components located within the housings and for diagnostic testing.

A further object of this disclosure is to provide a resilient bracket that has the desired qualities of sufficient strength and ability of securing a number of housings, yet be formed from a single piece of material.

The foregoing and other features and advantages of the present invention will become more apparent from the following description, drawings and appended claims.

BEST MODE FOR CARRYING OUT THE INVENTION

Figure 1:
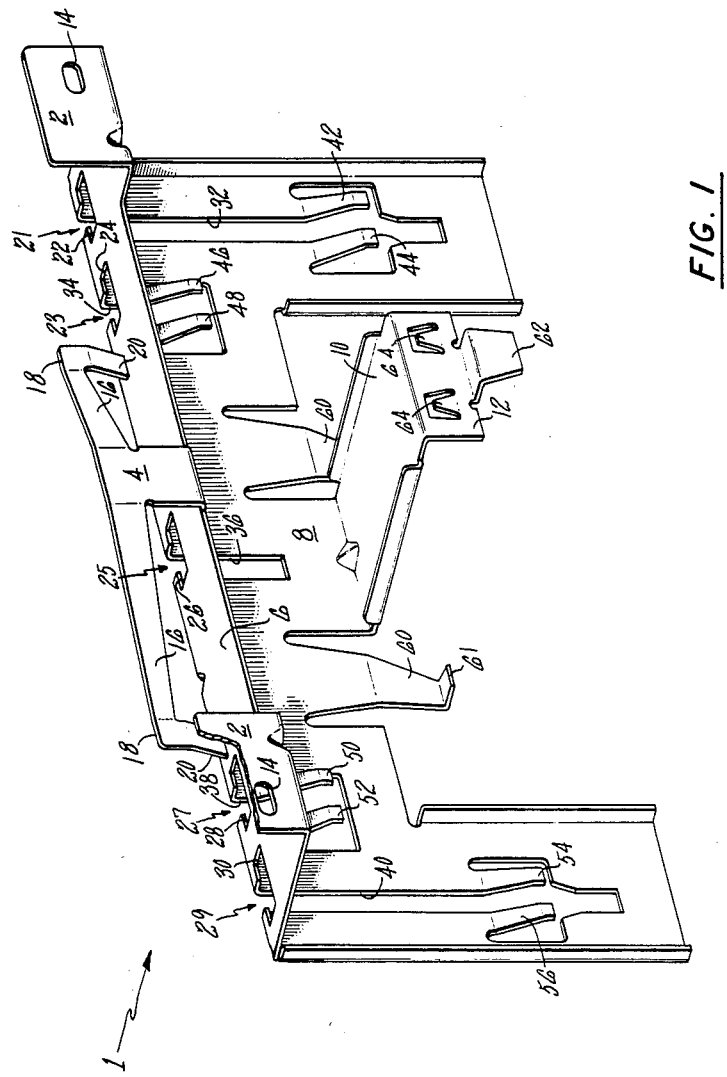
FIG. 1 is a rear perspective view of the resilient bracket, partly broken away.
Figure 2:
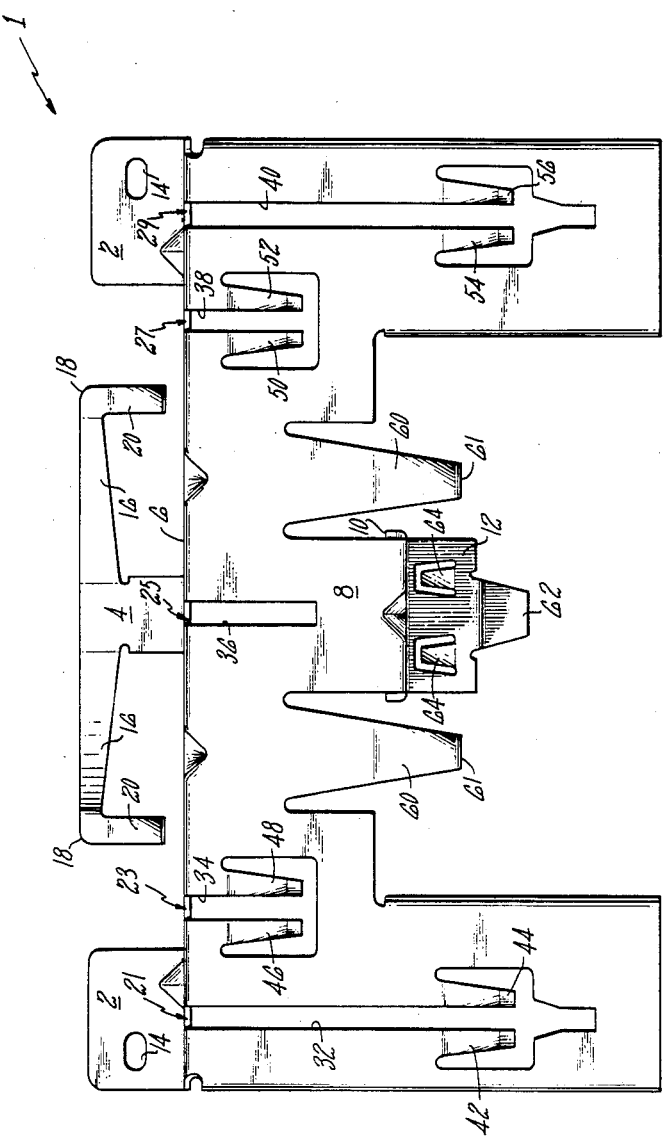
FIG. 2 is a front view of the resilient bracket.

Referring now to the drawings, FIG. 1 illustrates an embodiment of the resilient electrical component housing mounting bracket. Bracket 1 may be constructed of a material having appropriate characteristics of rigidity and resiliency, such as a low carbon steel or an appropriate plastic or composite material. The bracket can be economically formed from a unitary steel stamping. A front view of the bracket is shown in FIG. 2.

Figure 4:
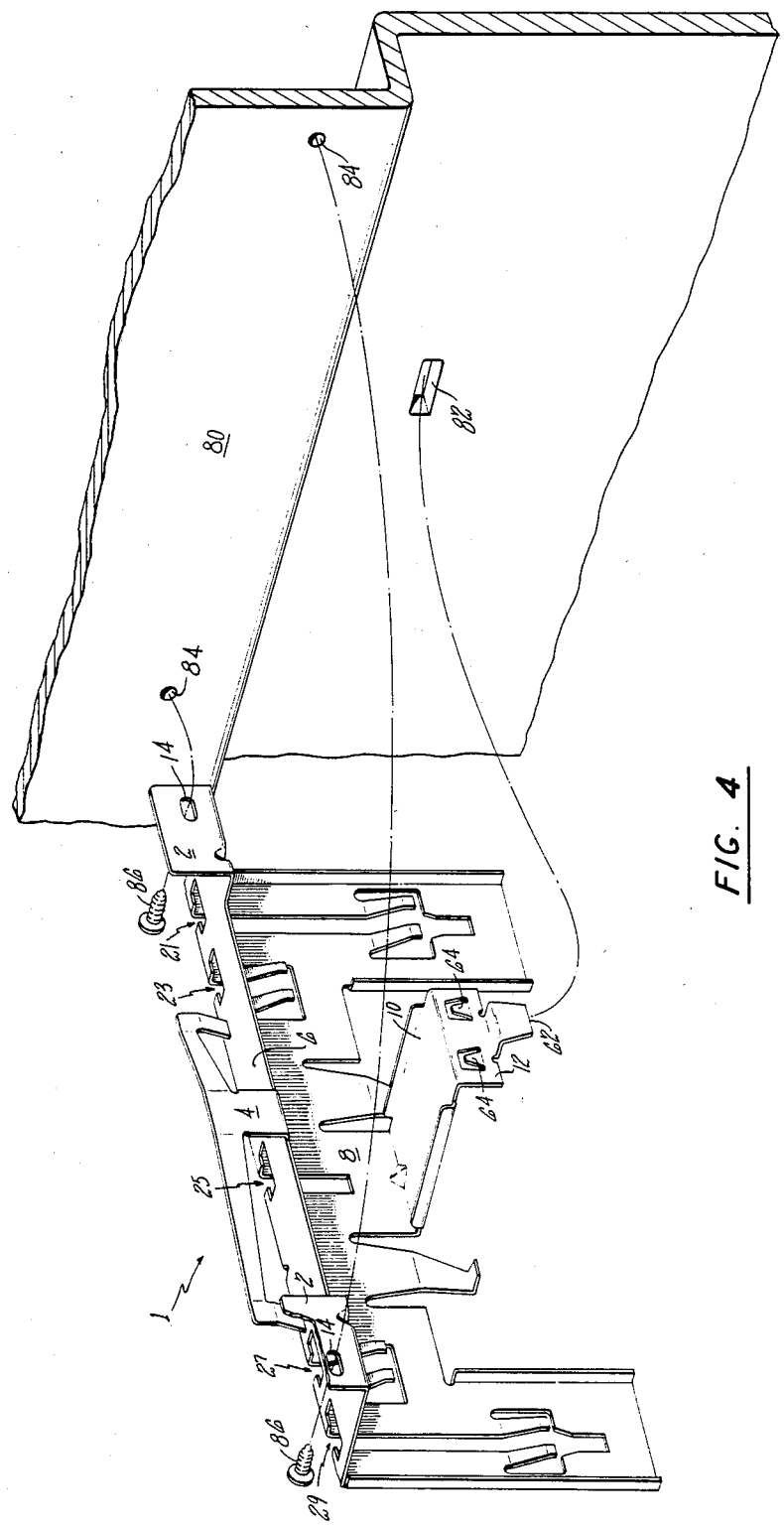
FIG. 4 is an exploded rear perspective view of the resilient bracket showing the placement of the bracket on a surface.

The embodiment shown in FIG. 1 includes fastening flanges 2 used for mounting the bracket onto a chosen surface. Fastening flanges 2 need not be perpendicular to secondary panel 6 as shown, but may be angled and shaped to accommodate an irregular mounting surface. Turning to FIG. 4, hole-means 14 are shown located in fastening flanges 2 allowing screw 86 to engage mounting surface 80 at opening 84 for securing bracket 1 to mounting surface 80.

Support member 10 is shown extending perpendicularly from main panel 8 with support flange 12 extending perpendicularly from support member 10. Support member 10 with support flange 12 act in conjunction with fastening flanges 2 to secure bracket 1 to a mounting surface 80 (see FIG. 4). As with fastening flanges 2, support member 10 and support flange 12 may be angled and shaped to accommodate an irregular mounting surface.

Support flange 12 in FIG. 1 is shown with primary locking tab 62 and secondary locking tabs 64 which interact with receiving slot 82 located in mounting surface 80 as illustrated in FIG. 4. Primary tab 62 is disposed into receiving slot 82 while secondary locking tabs abut against mounting surface 80 to provide, when assembled, a preload force for bringing the bracket away from mounting surface 80 to prevent primary locking tab 62 from rattling within receiving slot 82. The locking tabs are used to facilitate installation of bracket 1 and to decrease installation time over conventional screw means.

Bracket 1 can be mounted to more than one mounting surface at a time. For example, the fastening flanges could be secured to one surface while the support flange could be mounted to another mounting surface.

Figure 5:
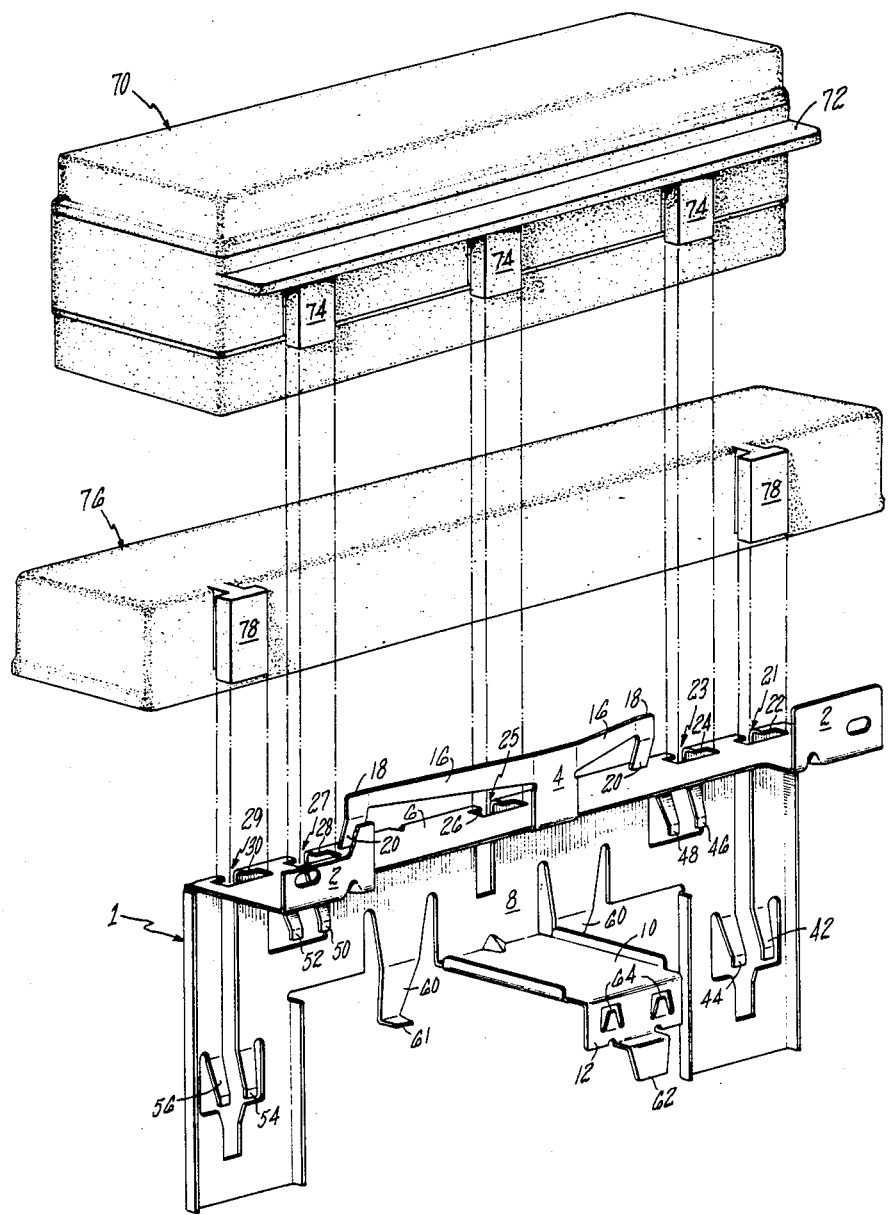
FIG. 5 is an exploded perspective view of two electrical component housings having prepositioned T-shaped keys to be received by the bracket.

Referring now to FIG. 5, relay box 76 is positioned above the bracket, and power network box 70 is positioned above relay box 76 on the front side of bracket 1. Boxes 70 and 76 (also called component housings) are exemplary and contain electrical components, however, the invention is not limited to what is contained within the boxes.

A plurality of keyways 21, 23, 25, 27 and 29 are located in bracket 1. The keyways accommodate keys 74 and 78 located on boxes 70 and 76, respectively. Keys 78 are T-shaped with the head of the T extending outwardly from box 76. Box 76 is shown positioned so that keys 78 are aligned with keys 21 and 29 so as to allow insertion of the keys into the keyways. Box 76 will be secured in its mounted position after keys 78 reach the lower end of keyways 21 and 29.

Figure 3:
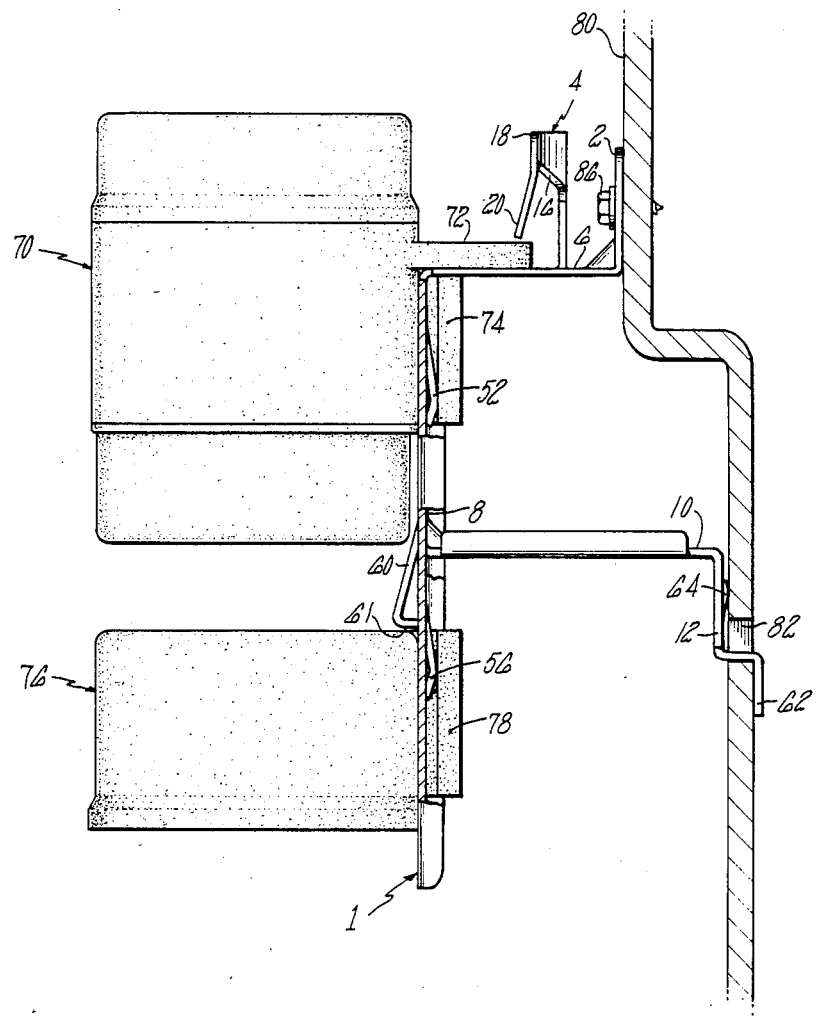
FIG. 3 is a side view of the resilient bracket partly broken away so as to show the housings fully installed on the bracket and the bracket mounted on a surface.

Power network box 70 is subsequently installed in a similar fashion. T-shaped keys as well as keyways 23, 25 and 27 are spaced apart from each other to avoid keyways 21 and 29. After installation, box 70 will be located above box 76 with respect to bracket 1 as shown in FIG. 3. Access to the interior of each box while mounted may be obtained by having the rear of each box oppose the other when mounted. FIG. 3 shows the final positioning of the housings while also illustrating this concept. The accessible portion of lowermost box 76 is facing downwards so that access to the interior may be achieved even though the box has been secured to the bracket, and the bracket has been mounted to a mounting surface. Uppermost box 70 is positioned with the rear of box 70 facing the rear of box 76 while the accessible portion of box 70 is facing upwards. The boxes could be designed to have the accessible portions of the boxes facing horizontally outwards, if desired. Bracket 1 need not be oriented vertically, but may be oriented in any suitable direction.

The bracket may be enlarged with additional keyways for allowing a multiplicity of boxes (housings) to be held simultaneously by a single bracket. Additionally, the keys do not have to be T-shaped, but may be of any shape that allows the keyways to retain the keys, yet allows the keys to slide in the keyways. A clearance between the keys and the keyways will permit easy installation of the housings while providing an additional benefit of preventing internal stresses to the keys or housings, if the bracket is flexed while in service.

Returning to FIG. 1, the previously described keyways are defined by lateral slots 22, 24, 26, 28 and 30 located in secondary panel 6 and are intersected by longitudinal slots 32, 34, 36, 38 and 40, respectively. In the illustrated embodiment, with the exception of longitudinal slot 36, the longitudinal slots terminate into pairs of adjacent cantilever spring members 42 & 44, 46 & 48, 50 & 52, and 54 & 56. The cantilever spring members are angled away from main panel 8 in the direction shown in FIG. 1 and the members terminate into ends which are angled so as to be generally parallel to main panel 8. The cantilever spring members provide a preload force against the respective housings to secure and prevent unwanted movement of the housings with respect to the bracket after the housings have been positioned in their resting places. It is not necessary to provide cantilever spring members in all of the longitudinal slots that are to receive keys from a given housing.

Once the housings have been positioned in their resting places (the keys have been fully inserted into their respective keyways), the housings must be prevented from moving longitudinally with respect to the bracket. Returning to FIGS. 3 and 5, the lowermost housing 76 is retained by identical housing retaining members 60 and 61. Housing retaining members 60 and 61 are angled from main panel 8 in the direction shown in FIG. 1, the members terminate into ends which are formed to rest against housing 76 after housing 76 has been positioned in its resting place. Housing retaining members 60 and 61 are resilient allowing housing 76 to deflect the members away from the housing when the housing is being installed in the bracket, the members return to rest against the housing after the housing clears the members. The ends of members 60 and 61 can be L-shaped as shown in FIG. 1, or may have a stepped edge that abuts against and around an edge of the housing (not shown).

Returning once again to FIGS. 3 and 5, uppermost housing 70 has flange 72 extending outwardly from the housing on the same side of the housing in which keys 74 are located. Flange 72 abuts against secondary panel 6 when housing 70 has been positioned in its resting place. Flange lock 4 overlies flange 72 and prevents housing 70 from moving longitudinally with respect to the bracket. Flange lock 4 includes locking beams 16 in which each beam has a free end 18. Leg 20 extends from free end 18 of each locking beam. Legs 20 are shaped to aid flange 72 of housing 70 in deflecting locking beam 16 away from the flange during the installation of housing 70 in the bracket. The locking beams return after being deflected, thereby permitting legs 20 to engage the flange after the housing reaches its resting place. In order to remove housings 70 and/or 76 from the bracket, locking beams 16 are deflected backwards to allow flange 72 to pass thereby allowing housing 70 to be removed from the bracket. Housing 76 is removed by either directly deflecting housing retaining members 60 and 61 backwards and then removing housing 76, or by applying enough longitudinal force to housing 76 in the direction of removal to cause the housing to deflect housing retaining members 60 and 61 thereby allowing the housing to pass.

Although the invention has been shown and described with respect to detailed embodiments thereof, it will be understood by those skilled in the art that various changes in the form and detail thereof may be made without departing from the spirit and scope of the invention.

We claim:

1. A resilient mounting bracket for securing a plurality of electrical component housings in a vertical arrangement relative to at least one mounting surface of a motor vehicle, said component housings including extending keys, comprising:

(a) a main panel having a vertical portion and a horizontal portion;
    (b) a plurality of key ways defined by the main panel, said key ways being appropriately sized and positioned to receive the keys of component housings and defined by a lateral slot defined by the horizontal portion of the main panel and a vertical slot defined by the vertical portion of the main panel;
    (c) at least one support member extending from the main panel, said support member having a support flange thereon for interfacing with a mounting surface to provide support to the main panel;

(d) at least one fastening flange extending from the main panel;

(e) fastening means interacting with the fastening flange relative to a mounting surface; and (f) means for independently securing keys of at least two electrical component housings to the main panel at predetermined locations whereby the component housings may be individually mounted to and removed from the bracket either before or after the bracket is secured to a motor vehicle.

2. A resilient mounting bracket as set forth in claim 1 which the same for independently securing at least two electrical component housings to the main panel comprises:

a plurality of flexible housing retaining members extending outwardly from the main panel for engaging said component housings to limit travel of said component housings along the keyways; and a plurality of spring members for engaging the keys of the housings to secure the housing in position relative to the main panel.

3. A resilient mounting bracket as set forth in claim 1 in which the bracket is a unitary steel stamping.

4. A resilient mounting bracket for securing a plurality of electrical component housings to at least one mounting surface, comprising:

(a) a main panel having a top edge and a bottom edge;

(b) a secondary panel extending perpendicularly from the top edge of the main panel, said secondary panel having a plurality of lateral slots located along the top edge of the main panel;

(c) a plurality of fastening flanges extending from the secondary panel at a predetermined angle with respect to the secondary panel;

(d) at least one support member extending from the main panel so as to be generally parallel to the secondary panel;

(e) at least one support flange extending from the support member at a predetermined angle with respect to the support member, said flange having at least one extending lock tab for interacting with a receiving slot located in the appropriate mounting surface;

(f) a plurality of keyways sized and spaced apart from each other for accommodating a corresponding key located on said component housing, said keyways being defined by the lateral slots, a plurality of longitudinal slots located in the main panel and being in communication with the lateral slots, said keyways terminating short of the bottom edge of the main panel;

(g) a pair of opposing cantilever spring members being located in a preselected number of keyways for interacting with the corresponding key located on said component housings;

(h) a plurality of flexible housing retaining members extending outwardly from the main panel for engaging said component housing; and (i) a flexible flange lock extending perpendicularly from the secondary panel, said flange lock having a pair of laterally opposed free ends, each free end having a leg projecting downwardly from the free end for engaging a flange located on said component housing whereby the keys of the component housing may be inserted into the keyways, the housings may be secured by the cantilever spring members and either the retaining members or the flange lock depending on the positioning of said housings.

5. A resilient mounting bracket as set forth in claim 4, wherein the component housings include extending T-shaped keys and in which the lateral slots in the secondary panel are rectangular in configuration.

6. A resilient mounting bracket as set forth in claim 4 which the bracket is a unitary steel stamping.

7. An assembly for securing electrical components to at least one mounting surface of a motor vehicle comprising:

(a) a first electrical component housing having at least one key extending from said housing;

(b) a second electrical component housing having at least one key extending from said housing; and (c) a resilient mounting bracket having a multiplicity of prepositioned keyways for cooperating with said keys for independently securing at least the first and second electrical component housings to the bracket, said bracket having at least one support member and at least one fastening flange extending from the bracket, and fastening means interacting with the fastening flanges to secure the fastening flanges to a mounting surface, said bracket further including a plurality of spring means for engaging and securing electrical components when assembled with the keys and the keyways.

8. An assembly as set forth in claim 7, further comprising:

(a) the keyways on the bracket having a plurality of spring members for engaging the keys and the housings;

(b) the bracket having at least one resilient retaining member for retaining the first or second electrical component housings; and (c) a flange extending from the first or second electrical component housing; and (d) a flange lock located on the bracket for locking the flange to the bracket.

* * * * *

UNITED STATES PATENT AND TRADEMARK OFFICE
CERTIFICATE OF CORRECTION

PATENT NO. : 4,847,733

DATED : July 11, 1989

INVENTOR(S) : Dhirendra C. Roy, et al

It is certified that error appears in the above-identified patent and that said Letters Patent is hereby corrected as shown below:

Claim 2, Column 5, Line 14, "which the same" should read --in which the means--.

Claim 2, Column 5, Line 22, after "secure the", "housing" should read --housings--.

Signed and Sealed this

Seventh Day of April, 1992

*Attest:*

HARRY F. MANBECK, JR.

*Attesting Officer*  *Commissioner of Patents and Trademarks*